United States Patent [19]

Dubuit et al.

[11] Patent Number: 4,798,277

[45] Date of Patent: Jan. 17, 1989

[54] DISTRIBUTION DEVICE FOR DELIVERING VERTICALLY DISPOSED OBJECTS ONE BY ONE TO A CONVEYOR

[75] Inventors: Jean-Louis Dubuit, Paris; Eric Rouly, Pontault Combault, both of France

[73] Assignee: Machines Dubuit, Paris, France

[21] Appl. No.: 7,086

[22] Filed: Jan. 27, 1987

[30] Foreign Application Priority Data

Jan. 27, 1986 [FR] France ............... 86 01077

[51] Int. Cl.⁴ ........................... B65G 47/24
[52] U.S. Cl. .................. 198/397; 198/400; 198/476.1
[58] Field of Search ........... 198/396, 397, 400, 408, 198/476.1, 576, 605, 383, 392, 803.15, 459, 604, 841, 837; 221/237, 265, 171, 173

[56] References Cited

U.S. PATENT DOCUMENTS

| | | | |
|---|---|---|---|
| 3,253,739 | 5/1966 | Martin | 198/803.15 X |
| 3,532,230 | 10/1970 | Gutberlet et al. | 198/604 X |
| 3,603,450 | 9/1971 | Chamberlain et al. | 198/841 X |
| 3,650,368 | 3/1972 | Nalbach | 198/397 |
| 3,662,872 | 5/1972 | Nalbach | 198/400 X |
| 3,792,949 | 2/1974 | Ueda | 221/237 X |
| 3,851,747 | 12/1974 | Van Der Roer | 198/803.15 X |
| 3,948,386 | 4/1976 | Nalbach | 198/400 X |
| 4,130,194 | 12/1978 | Schindel et al. | 198/397 |
| 4,176,741 | 12/1979 | Vogel | 198/459 X |
| 4,681,209 | 7/1987 | Marti | 198/392 |

FOREIGN PATENT DOCUMENTS 2370656 6/1978 France .

OTHER PUBLICATIONS

Research Disclosure, No. 131, Mar. 1975, p. 74, No. 13109, Industrial Opportunities Ltd. Vant. Hants., GB; "Supporting a Thin-Walled Container During Capping".

Primary Examiner—Robert J. Spar
Assistant Examiner—D. Glenn Dayoan
Attorney, Agent, or Firm—Charles E. Brown; Charles A. Brown

[57] ABSTRACT

A distributor device delivers vertically disposed objects one by one to a conveyor. It comprises a hopper receiving the objects in bulk and having an inclined axis. The bottom of the hopper is an inclined disk rotating about the inclined axis. Openings around the edge of the disk each receive objects one by one. Below and parallel to the disk is a plate in the upper part of which is a release opening aligned with the path of the openings of the disk. Chute members on an endless loop intermediate conveyor link the hopper to the conveyor. They move under the release opening and receive the objects one by one. The intermediate conveyor is driven in synchronism with the disk. One section of the intermediate conveyor is under the upper part of the plate and another section is over the conveyor.

30 Claims, 2 Drawing Sheets

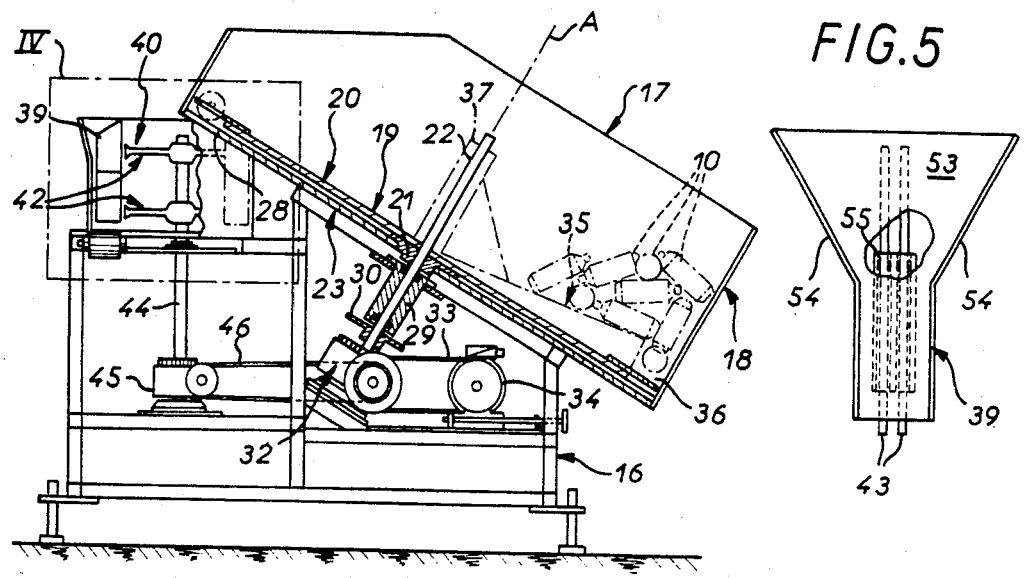
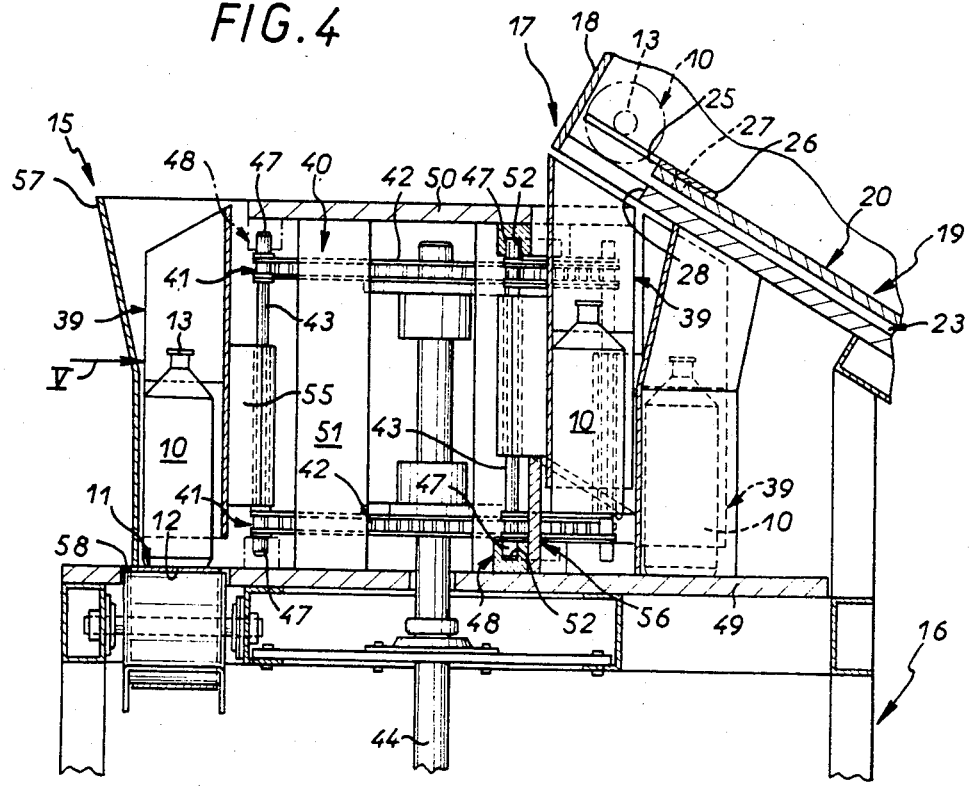

DISTRIBUTION DEVICE FOR DELIVERING VERTICALLY DISPOSED OBJECTS ONE BY ONE TO A CONVEYOR

BACKGROUND OF THE INVENTION

1. Field of the invention

The present invention is generally concerned with delivering vertically disposed objects one by one to a conveyor, for example bottles or other hollow articles made from synthetic material, and in particular with servicing an installation for applying any form of treatment to such objects.

2. Description of the prior art

The invention is more particularly directed to distribution devices of the kind comprising a hopper adapted to receive the objects in bulk and having an inclined axis, an inclined disk constituting the bottom of the hopper and adapted to rotate about the inclined axis, a plurality of openings at the periphery of the disk each adapted to receive one object, an inclined plate beneath and parallel to the disk, a release opening in an upper part of the plate aligned with the path of movement of the openings as the disk rotates, and a plurality of chute members between the hopper and the conveyor adapted to move under the release opening and each adapted to receive the objects one by one.

Thus each time that one of the objects to be distributed, entrained by the rotating disk at the bottom of the hopper and properly oriented horizontally by the opening in the rotating disk in which it must have become at least partially inserted in order to be entrained by it, arrives at the release opening from the hopper it falls under its own weight, simultaneously tilting about a horizontal axis, into the chute member beneath the release opening and thus reaches the conveyor, in the required vertical disposition.

A distribution device of this kind is described, for example, in French Pat. No 2 370 656.

In this disclosure, however, the chute members are constrained to rotate with the rotating disk of the hopper and, like the disk, they therefore constitute part of the hopper, being disposed in a compartment under the bottom of the hopper.

Although this arrangement can be satisfactory in some applications, and in particular those for which a relatively moderate distribution rate may suffice, it does have various disadvantages.

Firstly, because of the compartment that it has to comprise to accommodate the chute members the hopper is of relatively complex, frustoconical shape at the bottom.

Also, the inertia of the rotating mass is increased by that of the chute members, so that the driving means have to be rated to cater for this additional inertia.

Furthermore, because they are constrained to rotate with the rotating disk, the axis of which is inclined to the vertical, like that of the hopper, as the chute members move under the release opening from the hopper, one by one, they remain vertical for only a relatively short time interval, insufficient in any event for the objects to be distributed which fall into them to have time to pass through them and be released from them.

In practise, they can only be released on the next rotation and arrangements have to be made so that two objects to be distributed can be housed simultaneously in a chute member, stacked one on the other but appropriately isolated from each other.

Apart from the fact that the inertia of the rotating assembly is even further increased by the second series of objects to be distributed which has in this way to be driven through one complete revolution, and although the inevitable result is some increase in mechanical complexity because of the height that is then required for the chute members and the necessity to divide them vertically into two sections to secure the necessary separation of the two objects to be distributed which can be present in them simultaneously, the risk of the objects jamming in the chute members is commensurately increased.

Being accommodated within a compartment of the hopper, the chute members are difficult to gain access to, whereby any jamming of an object to be distributed in a chute member inevitably entails considerable disruption of the functioning of the installation, compromising its efficiency.

Finally, and most importantly, as the chute members are driven in rotation and are operative at the periphery of the hopper, and thus on a circumference of considerable diameter, when the objects to be distributed are released they are subjected to a high centrifugal force which seriously compromises their stability when they are taken up by the conveyor, with the attendent risk that they may topple over even if the conveyor is provided with suction means in an attempt to overcome this problem.

Once again, any unwanted wobbling of objects on the conveyor as they reach it can only be seriously prejudicial to functioning of the installation.

To keep the effects of centrifugal force within acceptable limits it is in practise necessary to accept a relatively moderate diameter for the hopper and/or a relatively moderate speed of rotation for the disk which forms its bottom, entailing a limitation on the capacity of the installation and in particular on the rate of distribution that it is able to achieve.

A general objective of the present invention is to provide an arrangement which, whilst making it possible to circumvent these disadvantages, offered the advantage of making it possible to achieve high rates of distribution, as well as other advantages.

SUMMARY OF THE INVENTION

The present invention consists in a distribution device for delivering vertically disposed objects one by one to a conveyor, comprising a hopper adapted to receive said objects in bulk and having an inclined axis, an inclined disk constituting the bottom of said hopper and adapted to rotate about said axis, a plurality of openings at the periphery of said disk each adapted to receive one object, an inclined plate beneath and parallel to said disk, a release opening in an upper part of said plate aligned with the path of movement of said openings as said disk rotates, a plurality of chute members between said hopper and said conveyor adapted to move under said release opening and each adapted to receive said objects one by one, and an endless loop intermediate conveyor carrying said chute members and adapted to be driven synchronously with said disk, said intermediate conveyor having one part under said upper part of said plate and another part over said conveyor.

By virtue of this arrangement the objects to be distributed can be safely placed on the conveyor without being subject to any centrifugal force and consequently without any risk of toppling.

All that is necessary is for the objects to be placed on the conveyor by a straight run of the intermediate conveyor employed in accordance with the invention.

In the distribution device in accordance with the invention a straight run of the intermediate conveyor locally overlies the conveyor to be fed with the objects.

As a result, there is no need to limit the distribution rate to minimize the effects of centrifugal force.

Also, as the chute members are carried by a conveyor separate from the hopper, each has to convey only one object at a time, so that it is possible to minimize their height and to make them extremely simple, and they advantageously remain vertical at all times, which minimizes the risk of an object jamming in them.

In any event, being separated from the hopper the chute members are easily accessible which, should an object to be distributed become jammed, advantageously minimizes the consequences of any such incident.

To summarize, the distribution device in accordance with the invention advantageously associates extremely secure functioning with the possibility of high rates of distribution and, using relatively simple mechanical design principles, it can be implemented at relatively moderate cost.

The characteristics and advantages of the invention will emerge from the following description given by way of example only with reference to the appended schematic drawings.

BRIEF DESCRIPTION OF THE DRAWINGS

FIG. 3 is a view of it in transverse cross-section on the broken line III—III in FIG. 2.

FIG. 4 shows to a larger scale the detail marked IV in FIG. 3.

FIG. 5 is a view in elevation and to a different scale of one of the chute members that the distribution device comprises, shown in isolation and as seen in the direction of the arrow V in FIG. 4.

DESCRIPTION OF THE PREFERRED EMBODIMENT

Figure 1:
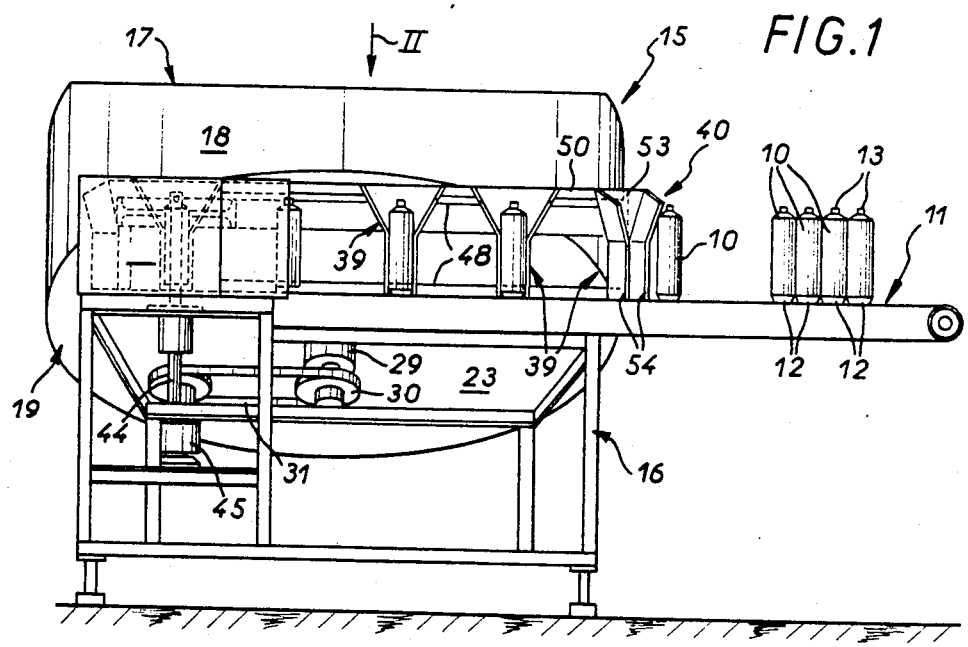
FIG. 1 is a view in elevation of a distribution device in accordance with the invention.
Figure 2:
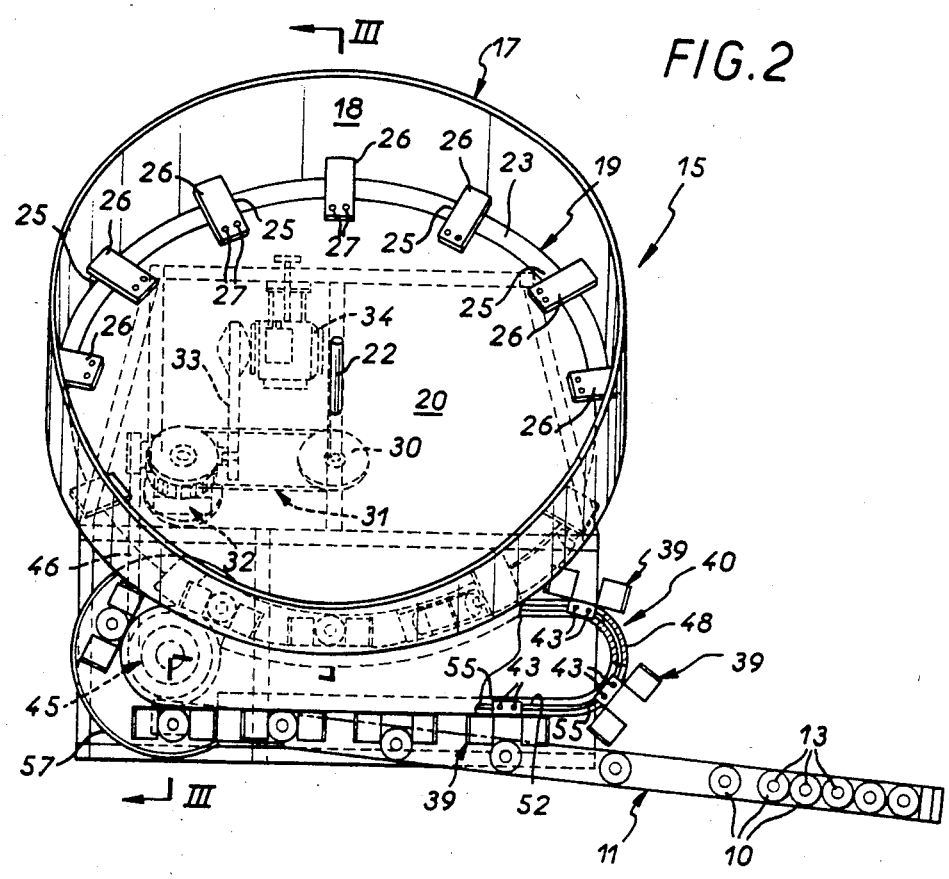
FIG. 2 is a locally cutaway plan view of it as seen in the direction of the arrow II in FIG. 1, with certain components normally present in the hopper removed.

As shown in the figures, the overall objective is to deliver vertically disposed objects 10 one by one to a conveyor 11 in turn servicing an installation of any kind.

In the example shown, the objects 10 to be distributed in this way are bottles, to be more precise synthetic material bottles with a base 12 and neck 13, and the bottles are to be placed with their base 12 on the conveyor 11.

The conveyor 11 is a conveyor belt in this specific embodiment.

As it is a conventional type conveyor belt it will not be described here.

It will suffice to indicate that, if required and in a way that it known of itself, suction means may be associated with its upper run in order to stabilize the bottles 10 and over part at least of its length the upper run may extend between guides adapted to secure appropriate guidance of the bottles 10.

The distribution device 15 for delivering bottles 10 to the conveyor 11 comprises a frame 16 the construction of which is conventional in this art and, being obvious to those skilled in the art, will not be described in detail here, carrying a hopper 17 which, as schematically represented in chain-dotted line in figure 3, is designed to receive the bottles 10 to be distributed in bulk; its axis A, also schematically represented in chain-dotted line in FIG. 3, is inclined to the vertical.

The hopper 17 comprises a tube 18 which constitutes its lateral wall and a bottom 19 substantially perpendicular to the axis A.

The tube 18 is a cylindrical tube with a circular contour and the upper part of its free edge is cut away so that the top is level.

The tube 18 is fixed.

On the other hand, the bottom 19 is formed by a disk 20 mounted on a hub 21 on, and constrained to rotate with, a shaft 22 disposed along the axis A; it rotates about the axis A and disposed beneath it and parallel to it is a fixed plate 23.

The plate 23 extends over the entire transverse cross-section of the tube 18 and is carried by the frame 16. Its edge carries the tube 18 and it has an opening at its center for the shaft 22 and the hub 21 to pass through.

As an alternative to this, the plate 23 could be reduced to a ring in the vicinity of the tube 18, which is supported in some other way.

The rotating disk 20 features a plurality of openings 25 circumferentially distributed around its periphery, and thus in the vicinity of the tube 18, each adapted to receive a bottle 10 lying down and to entrain the bottles 10 to be distributed one by one.

The openings 25 are defined by lugs 26 removably attached by screws 27 to the rotating disk 20 and circumferentially separated from each other by a distance substantially corresponding to the height of the bottles 10, excluding the neck 13; in the radial direction they extend substantially to the immediate vicinity of the tube 18, projecting cantilever fashion from the rotating disk 20.

This type of arrangement favors rapid adaptation of the distribution device 15 to handle bottles 10 of different heights.

All that is needed is to reposition the lugs 26 appropriately at the edge of the rotating disk 20.

As an alternative to this, however, the openings 25 that the rotating disk 20 thus features at its edge could be formed by notches in it, adaptation to suit bottles 10 of different heights then entailing changing the entire rotating disk 20.

The openings 25 in the rotating disk 20 form with the underlying fixed plate 23 cells into which the bottles 10 to be distributed can become individually inserted to substantially half-height, with the neck 13 overlying the corresponding lug 26, as shown schematically in chain-dotted line for one of them in FIG. 3.

In its upper part the fixed plate 23 comprises a release opening 28 situated on the path of movement of the openings 25 in the rotating disk 20; it is adapted to have the bottles 10 to be distributed pass through it one by one.

The shaft 22 with which the rotating disk 20 is constrained to rotate is supported by a bearing 29 in turn supported by the frame 16; keyed to the shaft 22 and constrained to rotate with it is a gear 30 coupled by a transmission arrangement 31 to the output shaft of a speed reducer 32 the input shaft of which is coupled by a transmission arrangement 33 to the output shaft of a motor 34.

By virtue of arrangements that are known in themselves, in particular from the aforementioned French patent, and which will not be described in detail here for this reason, there is further provided within the hopper 17, and as schematically represented in chain-dotted line in FIG. 3, a shoe 35 which has a corner-shape profile in the radial direction, flaring outwardly towards the tube 18, there being between the shoe and the tube 18, in line with the openings 25 in the rotating disk 20, a corridor 36 adapted to have the bottles 10 to be distributed pass through it one by one and which extends over a sector of a circle subtending at the center an angle in the order of 180°.

Fastened to a hub 37 rotating on the shaft 22, the shoe 35 is adapted to rotate about the shaft 22 with an alternating to-and-fro motion similar to that of a pendulum.

The distribution device 15 further comprises a plurality of chute members 39 which are disposed between the hopper 17 and the conveyor 11 to be fed with bottles; each is adapted to receive one of the bottles to be distributed and they are adapted to pass one by one beneath the release opening 28 from the hopper 17.

The chute members 39 are carried by and protrude outwardly from a separate conveyor 40, meaning a conveyor that is separate from the hopper 17 and from the conveyor 11 to be fed with bottles; for convenience this will be referred to hereinafter as the intermediate conveyor.

The intermediate conveyor is an endless loop conveyor lying in a substantially horizontal plane and driven synchronously with the rotating disk 20 of the hopper 17; part of its course runs under the upper part of the bottom 19 of the hopper 17 while another part of its course overlies the conveyor 11 to be fed with bottles.

The intermediate conveyor 40 comprises two parallel chains 41 at different heights each passing over a drive sprocket 42; pairs of vertical rods 43 extend between corresponding links of the two chains, the pins joining the links being hollow for this purpose.

Each of the chains 41 passes around only one sprocket 42, which is a drive sprocket.

The two sprockets 42 of the intermediate conveyor 40 are spaced from each other on a vertical shaft 44 with which they are constrained to rotate and which forms the output shaft of a second speed reducer 45 the input shaft of which is coupled by a transmission arrangement 46 to the input shaft of the previously mentioned speed reducer 32, which is appropriately lengthened for this purpose.

Thus the intermediate conveyor 40 is driven synchronously with the rotating disk 20 of the hopper 17.

By means of spaced pegs 47 carried by the chains 41 that constitute it, and formed by extensions of the rods 43, the intermediate conveyor 40 interacts with guides 48, which, in conjunction with the drive sprockets 42 for the chains 41, define its path.

One of the guides 48, the lower guide, is carried by a floor 49 which, supported in turn by the frame 16, is level with the upper run of the conveyor 11 to be fed with bottles; the other, or upper guide is carried by a ceiling 50 parallel to the floor 49 and supported at various points by columns 51 carried by the floor.

The two guides 48 are analogous to each other.

They are channels of U-shaped transverse cross-section having their concave sides facing towards each other and within the groove 52 in which slide the corresponding ends of the rods 43.

As seen in plan view the general contour of the guides 48 is U-shaped with the concave side facing towards the corresponding drive sprocket 42.

The branch of this contour nearer the hopper 17 is locally curved to match the shape of the hopper 17, whereas the other is straight.

Thus the intermediate conveyor 40 has one run extending alongside the hopper 17, matching the shape thereof in a localized way, whereas its other run services the conveyor 11 to be fed with bottles, this other run advantageously being straight.

Each of the chute members 39 carried by the intermediate conveyor 40 comprises a flange 53 by means of which it is fixed to the intermediate conveyor 40 and two lateral branches 54 projecting cantilever fashion from the flange 53 and substantially perpendicular to it.

Procuring an overall Y-shaped contour, the branches 54 are substantially parallel to each other in their lower part, the distance between them being slightly greater than the diameter of the bottles 10 to be distributed, and diverge from each other in their upper part.

To match the inclination of the bottom 19 of the hopper 17 their upper end is cut away slantwise, their corresponding edge extending obliquely downwards from the flange 53, reflecting this inclination.

The chute members 39 slide on the rods 43 of the intermediate conveyor 40 which carries them, so that they follow the bottom 19 of the hopper 17 optimally as they move along.

To this end the flange 53 of each bucket is fitted on the back with a member 50 through which it is slidably mounted on the corresponding pair of rods 43 of the intermediate conveyor 40.

There is also associated with the intermediate conveyor 40 a cam 56 which follows the contour of the upper part of the edge of the bottom 19 of the hopper 17, and which is disposed on the path of movement of the chute members 39, causing them to slide along the rods 43 to follow the aforementioned contour.

The cam 56 comprises a plate curved to the profile of the hopper 17 and carried by the floor 49, to which it is substantially perpendicular, at the edge of the corresponding side 48; its upper edge is designed to cooperate with the lower surface of the members 55 of the chute members 39, in order to raise these and then return them to their original level.

The end of the intermediate conveyor 40 comprising the drive sprockets 42 is surrounded by a cover 57 which, following the contour of the drive sprockets 42, extends from the hopper 17, from a point in line with the release opening 28 therefrom, to the upstream end of the conveyor 11 to be fed with bottles, in order to secure good lateral support of the bottles 10 normally present in the chute members 39 on this part of the intermediate conveyor 40.

The lower part of the cover 57 is cylindrical, its upper part being flared in a frustoconical shape.

It also extends a short distance along the conveyor 11 to be fed with bottles.

It will be noted that the upstream end of the conveyor 11 to be fed with bottles is inserted into a cut-out 58 in the floor 49 above which extends at least part of the course of the intermediate conveyor 40, so as to be overlaid by the latter at this upstream end.

The bottles 10 to be distributed are tipped into the hopper 17 in loose bulk.

They collect in the lower part of the hopper where the shoe 35 stirs them so as to oblige them to enter the corridor 36, orienting them substantially circumferentially relative to the rotating disk 20, at its edge, with the neck 13 facing either in the direction of rotation of the rotating disk 20 or in the opposite direction.

As they reach the bottom part of the hopper 17, at least some of the openings 25 at the edge of the rotating disk 20 receive a bottle 10, one way round or the other, and entrain it towards the upper part of the hopper 17.

Entrained in this way the bottles 10 to be distributed thus arrive at the release opening 28 in turn.

They do so either with the neck 13 leading or with the neck 13 trailing.

In either case, the neck 13 rests on the corresponding lug 26 of the opening 25 in which they are accommodated.

If they arrive with the neck 13 leading, the lug 26 holds them back temporarily and it is not until they have passed over the release opening 28 that, tilting about the lug 26, they drop into the release opening 28 bottom first.

If they arrive with the neck 13 trailing, however, they drop directly into the release opening 28, bottom first, as soon as they reach it.

Thus in either case they fall with the bottom 12 at the bottom.

Entrained by the intermediate conveyor 40, the chute members 39 arrive in turn under the release opening 28, in synchronism with the openings 25 in the rotating disk 20.

Because of the cam 56, as they follow the bottom 19 of the hopper 17 they pass progressively from a low position to a high position before returning to their initial low position.

As they pass under the release opening 28 they each receive a bottle 10 to be distributed, bottom first, provided that there is actually a bottle 10 in the corresponding opening 25 of the rotating disk 20.

Guiding them as they fall until they rest with their bottom 12 on the floor 49, the chute members 39 entrain the bottles 10 that they have previously received in the direction towards the upstream end of the conveyor 11 to be fed with bottles; when the bottles 10 reach the conveyor 11, they are in turn taken up by it.

For this to take place under appropriate conditions, in other words in order for the intermediate conveyor 40 to overlie the conveyor 11 to be fed with bottles over a sufficient distance for the bottles 10 to be passed from one conveyor to the other in a progressive way, the conveyor 11 to be fed with bottles and the relevant run of the intermediate conveyor 40 are in a "whistle-shaped" relationship to each other, as can be seen in the drawings.

The relevant run of the intermediate conveyor 40 is straight over its entire length, extending substantially perpendicularly to a diametral plane of the assembly; the conveyor 11 to be fed with bottles lies slightly obliquely to the normal to this diametral plane.

In an alternative embodiment (not shown) the guides 48 confer on the intermediate conveyor a configuration such that the conveyor 11 to be fed with bottles may extend substantially perpendicularly to the corresponding diametral plane of the assembly, the relevant run of the intermediate conveyor 40 then extending obliquely relative to the normal to this diametral plane, for example.

Also, it is not necessary for this run of the intermediate conveyor 40 to be straight over all of its length.

To prevent the bottles 10 being subject to any centrifugal force when they are put onto the conveyor 11, it is sufficient for the part of the relevant run of the intermediate conveyor 40 by which this is done, that is to say the part of the intermediate conveyor 40 overlying the conveyor 11 to be fed with bottles, in order to service it, to be straight.

The present invention is not limited to the embodiment described and shown, but encompasses any variant execution.

For example, the pegs by which the intermediate conveyor interacts with the guides may be separate from the rods, rather than consisting of extensions of the rods.

There is claimed:

1. Distribution device for delivering in vertical orientation objects one by one to a horizontal conveyor, comprising a hopper adapted to receive the objects randomly and having an inclined axis, an inclined disk constituting the bottom of said hopper and adapted to rotate about said axis, a plurality of openings at the periphery of said disk each adapted to receive one object, an inclined plate beneath and parallel to said disk, a release opening in an upper part of said plate aligned with the path of movement of said openings as said disk rotates, a plurality of vertical chute members between said hopper and said conveyor adapted to move under said release opening and each adapted to receive the objects one by one and orient them vertically, said vertical chute members being through chute members each having an inlet end and an outlet end with said outlet end being adapted to be in immediate overlying relation with said conveyor to transfer objects to said conveyor, and an endless loop intermediate conveyor carrying said chute members and adapted to be driven synchronously with said disk, said intermediate conveyor having one part passing under said upper part of said plate and another part passing over said conveyor.

2. Device according to claim 1, wherein said one part of said intermediate conveyor comprises a run along the periphery of said hopper and said other part services said conveyor.

3. Device according to claim 1, wherein said other part of said intermediate conveyor passing over and servicing said conveyor is straight and extends generally in the same direction as said conveyor.

4. Device according to claim 1, further comprising a floor level with said conveyor situated beneath at least part of said intermediate conveyor.

5. Device according to claim 1, further comprising at least one guide and pegs by means of which said intermediate conveyor interacts with said at least one guide.

6. Device according to claim 4, further comprising at least one guide and pegs by means of which said intermediate conveyor interacts with said at least one guide, wherein said floor carries one guide.

7. Device according to claim 6, further comprising a ceiling, a guide on said ceiling similar to said guide on said floor, and pegs on said intermediate conveyor whereby it interacts with said guide on said ceiling, said intermediate conveyor lying between said floor and said ceiling.

8. Device according to claim 5, wherein said intermediate conveyor comprises two parallel chains at different levels, at least one drive sprocket around which each of said chains is passed, and rods disposed between the links of said chains, said pegs being extensions of said rods.

9. Device according to claim 7, wherein said intermediate conveyor comprises two parallel chains at different levels, at least one drive sprocket around which each of said chains is passed, and rods disposed between the links of said chains, said pegs are extensions of said rods.

10. Distribution device according to claim 1 wherein said intermediate conveyor generally lies in a horizontal plane.

11. Device according to claim 1, the objects being bottles or other hollow articles and wherein said chute members are constructed and arranged to receive and orient the bottles or other hollow articles vertically.

12. Device according to claim 1, wherein chute members are adapted to guide the objects from said intermediate conveyor to said conveyor.

13. Distribution device for delivering vertically disposed objects one by one to a conveyor, comprising a hopper adapted to receive said objects in bulk and having an inclined axis, an inclined disk constituting the bottom of said hopper and adapted to rotate about said axis, a plurality of openings at the periphery of said disk each adapted to receive one object, an inclined plate beneath and parallel to said disk, a release opening in an upper part of said plate aligned with the path of movement of said openings as said disk rotates, a plurality of chute members between said hopper and said conveyor adapted to move under said release opening and each adapted to receive said objects one by one, and an endless loop intermediate conveyor carrying said chute members and adapted to be driven synchronously with said disk, said intermediate conveyor having one part under said upper part of said plate and another part over said conveyor, said intermediate conveyor comprising two parallel chains at different heights, at least one drive sprocket around which each chain is passed, and rods disposed between the links of said chains on which said chute members are adapted to slide.

14. Device according to claim 13, further comprising a cam associated with said intermediate conveyor, following the contour of the upper part of the bottom edge of said hopper and disposed on the path of movement of said chute members so as to cause said chute members to slide on said rods to follow said contour.

15. Device according to claim 13, further comprising a floor level with said conveyor situated beneath at least part of said intermediate conveyor.

16. Device according to claim 14, further comprising a floor level with said conveyor situated beneath at least part of said intermediate conveyor, wherein said cam is carried by said floor.

17. Device according to claim 13, further comprising at least one guide and pegs by means of which said intermediate conveyor interacts with at least one guide.

18. Device according to claim 15, further comprising at least one guide and pegs by means of which said intermediate conveyor interacts with said at least one guide, wherein said floor carries said one guide.

19. Device according to claim 18, further comprising a ceiling, a guide on said ceiling similar to said guide on said floor, and pegs on said intermediate conveyor whereby it interacts with said guide on said ceiling, said intermediate conveyor lying between said floor and said ceiling.

20. Device according to claim 17, wherein said pegs are extensions of said rods.

21. Device according to claim 19, wherein said pegs are extensions of said rods.

22. Distribution device for delivering in vertical orientation objects one by one to a horizontal conveyor, comprising a hopper adapted to receive the objects randomly and having an inclined axis, an inclined disk constituting the bottom of said hopper and adapted to rotate about said axis, a plurality of openings at the periphery of said disk each adapted to receive one object, an inclined plate beneath and parallel to said disk, a release opening in an upper part of said plate aligned with the path of movement of said openings as said disk rotates, a plurality of through vertical chute members between said hopper and said conveyor adapted to move under said release opening and each adapted to receive the objects one by one and orient them vertically and feed them to said conveyor, and an endless loop intermediate conveyor carrying said chute members and adapted to be driven synchronously with said disk, said intermediate conveyor having one part passing under said upper part of said plate and having a configuration substantially matching that of a peripheral portion of said hopper and another part passing over said conveyor.

23. Device according to claim 22, wherein at least said other part of said intermediate conveyor overlying and servicing said conveyor is straight and extends generally in the same direction as said conveyor.

24. Device according to claim 22, the objects being bottles or other hollow articles and wherein said chute members are constructed and arranged to receive and orient the bottles or other hollow articles vertically.

25. Device according to claim 22, wherein chute members are adapted to guide the objects from said intermediate conveyor to said conveyor.

26. Distribution device for delivering in vertical orientation objects one by one to a conveyor, comprising a hopper adapted to receive said objects in bulk and having an inclined axis, an inclined disk constituting the bottom of said hopper and adapted to rotate about said axis, a plurality of openings at the periphery of said disk each adapted to receive one object, an inclined plate beneath and parallel to said disk, a release opening in an upper part of said plate aligned with the path of movement of said openings as said disk rotates, a plurality of through chute members between said hopper and said conveyor adapted to move under said release opening and each adapted to receive said objects one by one and feed such objects to said conveyor, and an endless loop intermediate conveyor being adapted to be driven synchronously with said disk, said chute members being carried by said intermediate conveyor and protruding outwardly thereof, said intermediate conveyor having one part passing under said upper part of said plate and another part passing over said conveyor.

27. Device according to claim 26, wherein said one part of said intermediate conveyor runs alongside and matches the configuration of a peripheral portion of said hopper and said other part services said conveyor.

28. Device according to claim 26, wherein at least said other part of said intermediate conveyor is straight and extends generally in the same direction as said conveyor.

29. Device according to claim 26, the objects being bottles or other hollow articles and wherein said chute members are constructed and arranged to receive and orient the bottles or other hollow articles vertically.

30. Device according to claim 26, wherein chute members are adapted to guide the objects from said intermediate conveyor to said conveyor.

* * * * *